(12) United States Patent
Terada et al.

(10) Patent No.: US 7,236,185 B2
(45) Date of Patent: Jun. 26, 2007

(54) IMAGE CAPTURING SYSTEM

(75) Inventors: Tomoyuki Terada, Toyonaka (JP);
Masayuki Ueyama, Takarazuka (JP);
Kazuhiro Shibatani, Sakai (JP);
Kentaro Iida, Ikoma (JP)

(73) Assignee: Minolta Co., Ltd., Osaka (JP)

( * ) Notice: Subject to any disclaimer, the term of this patent is extended or adjusted under 35 U.S.C. 154(b) by 888 days.

(21) Appl. No.: 10/156,302

(22) Filed: May 28, 2002

(65) Prior Publication Data

US 2002/0191080 A1 Dec. 19, 2002

(30) Foreign Application Priority Data

May 30, 2001 (JP) .............................. 2001-162582

(51) Int. Cl.
*H04N 5/225* (2006.01)
*H04N 5/232* (2006.01)

(52) U.S. Cl. .............................. 348/207.11; 348/211.2; 348/211.4

(58) Field of Classification Search ........... 348/207.11, 348/207.1, 211.2, 211.3, 211.4
See application file for complete search history.

(56) References Cited

U.S. PATENT DOCUMENTS

| | | | |
|---|---|---|---|
| 4,420,773 A | 12/1983 | Toyoda et al. | ............... 358/335 |
| 4,837,817 A | 6/1989 | Maemori | .................... 358/224 |
| 5,748,234 A * | 5/1998 | Lippincott | ............... 348/222.1 |
| 6,005,613 A * | 12/1999 | Endsley et al. | ........... 348/231.6 |
| 6,480,671 B2 * | 11/2002 | Takahashi et al. | ........... 386/117 |
| 6,538,686 B2 * | 3/2003 | Hara et al. | ................ 348/14.12 |
| 6,677,990 B1 * | 1/2004 | Kawahara | ............... 348/211.13 |
| 6,906,818 B1 * | 6/2005 | Makishima | ................. 358/1.15 |
| 6,970,189 B1 * | 11/2005 | Bernstein et al. | ......... 348/211.2 |
| 2001/0030692 A1 * | 10/2001 | Yoneda | ...................... 348/207 |

FOREIGN PATENT DOCUMENTS

| | | |
|---|---|---|
| JP | 05-284399 A | 10/1993 |
| JP | 05284399 A * | 10/1993 |
| JP | 10070641 A * | 3/1998 |

\* cited by examiner

*Primary Examiner*—Lin Ye
(74) *Attorney, Agent, or Firm*—Sidley Austin LLP (57) ABSTRACT

When an image capturing apparatus and an operation apparatus become connected to each other, function information is transmitted from the image capturing apparatus to the operation apparatus. The operation apparatus can recognize the functions effective in the image capturing apparatus by receiving the function information from the image capturing apparatus. The operation apparatus compares the received function information with the functions that can be processed by the operation apparatus, and sets the protocol. The protocol includes ones that is associated with a moving image attribute associated with moving image data and that is associated with the shooting function of the image capturing apparatus. Then, the operation apparatus transmits protocol information to the image capturing apparatus. Thereafter, the image capturing apparatus and the operation apparatus perform data communication based on the protocol.

19 Claims, 5 Drawing Sheets

IMAGE CAPTURING SYSTEM

This application is based on the application No. 2001-162582 filed in Japan, the content of which is hereby incorporated by reference.

BACKGROUND OF THE INVENTION

1. Field of the Invention

The present invention relates to a technology to control an image capturing apparatus through a remote operation.

2. Description of the Related Art

An image capturing system has previously been known in which images are shot by remotely operating an image capturing apparatus such as a digital camera from an operation apparatus such as a portable telephone. In the conventional image capturing system, the operation apparatus has a display, and the image data obtained from the image capturing apparatus is displayed on the display through data communication.

However, cases are considered where one image capturing apparatus is remotely operated by different kinds of operation apparatuses and where one operation apparatus remotely operates different kinds of image capturing apparatuses. In such cases, it occurs that the image capturing apparatus transmits a large amount of image data that cannot be processed by the operation apparatus and that a command associated with a function that the image capturing apparatus is not provided with is transmitted from the operation apparatus. Consequently, the image capturing system does not function normally.

Accordingly, the present invention is made in view of the above-mentioned problem, and an object thereof is to prevent unprocessable data from being transmitted from the image capturing apparatus to the operation apparatus and prevent unexecutable commands from being transmitted from the operation apparatus to the image capturing apparatus.

Another object of the present invention is to provide an image capturing system capable of appropriately performing image transmission and operation by an image capturing apparatus and an operation apparatus.

SUMMARY OF THE INVENTION

To attain the above-mentioned objects, an image capturing apparatus of the present invention comprises: an image generator for shooting a subject and for generating an image signal; an image processor for receiving the image signal generated by the image generator and for generating moving image data; a receiver for receiving, from an operation apparatus, information on a moving image function that can be executed by the operation apparatus; a controller for causing the image processor to perform an image processing based on the information on the moving image function; and a transmitter for transmitting, to the operation apparatus, moving image data processed based on the information on the moving image function.

By the image capturing apparatus having the above-described structure, unprocessable moving image data can be prevented from being transmitted from the image capturing apparatus to the operation apparatus, so that moving image transmission and reception between the image capturing apparatus and the operation apparatus can be appropriately performed.

To attain the above-mentioned objects, an operation apparatus of the present invention comprises: a receiver for receiving moving image data from the image capturing apparatus; a display for displaying a moving image based on the received moving image data; a transmitter for transmitting information on a moving image function that can be processed by the operation apparatus to the image capturing apparatus before the moving image data is received; and a controller for causing the display to display the moving image based on the moving image data received from the image capturing apparatus.

According to the operation apparatus having the above-described structure, unprocessable data can be prevented from being transmitted from the image capturing apparatus, so that moving image transmission and reception between the image capturing apparatus and the operation apparatus can be appropriately performed.

To attain the above-mentioned objects, another image capturing apparatus of the present invention comprises: an image generator for shooting a subject and for generating an image signal; an image processor for receiving the image signal generated by the image generator and for generating image data; a function information receiver for receiving, from an operation apparatus, function information of the operation apparatus; a transmitter for transmitting function information of the image capturing apparatus to the operation apparatus before the image data is generated; a command receiver for receiving, from an operation apparatus, a command corresponding to the function information of the image capturing apparatus; and a controller for controlling the image generator based on the received command and for controlling the image processor based on the received function information of the operation apparatus.

According to the image capturing apparatus having the above-described structure, unexecutable commands can be prevented from being transmitted from the operation apparatus, so that an image capturing apparatus appropriately operated by the operation apparatus can be realized.

To attain the above-mentioned objects, another operation apparatus of the present invention comprises: an operation member for inputting an operation command to an image capturing apparatus; a receiver for receiving information on a function of the image capturing apparatus from the image capturing apparatus; a controller for determining an operation target function of the image capturing apparatus based on the information on the function of the image capturing apparatus; a command transmitter for transmitting, when an operation command associated with the operation target function by the operation member is issued, a command corresponding to the operation command to the image capturing apparatus; and a function information transmitter for transmitting function information of the operation apparatus to the image capturing apparatus before the command is transmitted.

According to the operation apparatus having the above-described structure, since a command associated with a function effective in the image capturing apparatus can be transmitted, operation of the image capturing apparatus by the operation apparatus can be appropriately performed.

In the following description, like parts are designated by like reference numbers throughout the several drawings.

DETAILED DESCRIPTION OF THE PREFERRED EMBODIMENT

An embodiment of the present invention will be described in detail with reference to the drawings.

Figure 1:
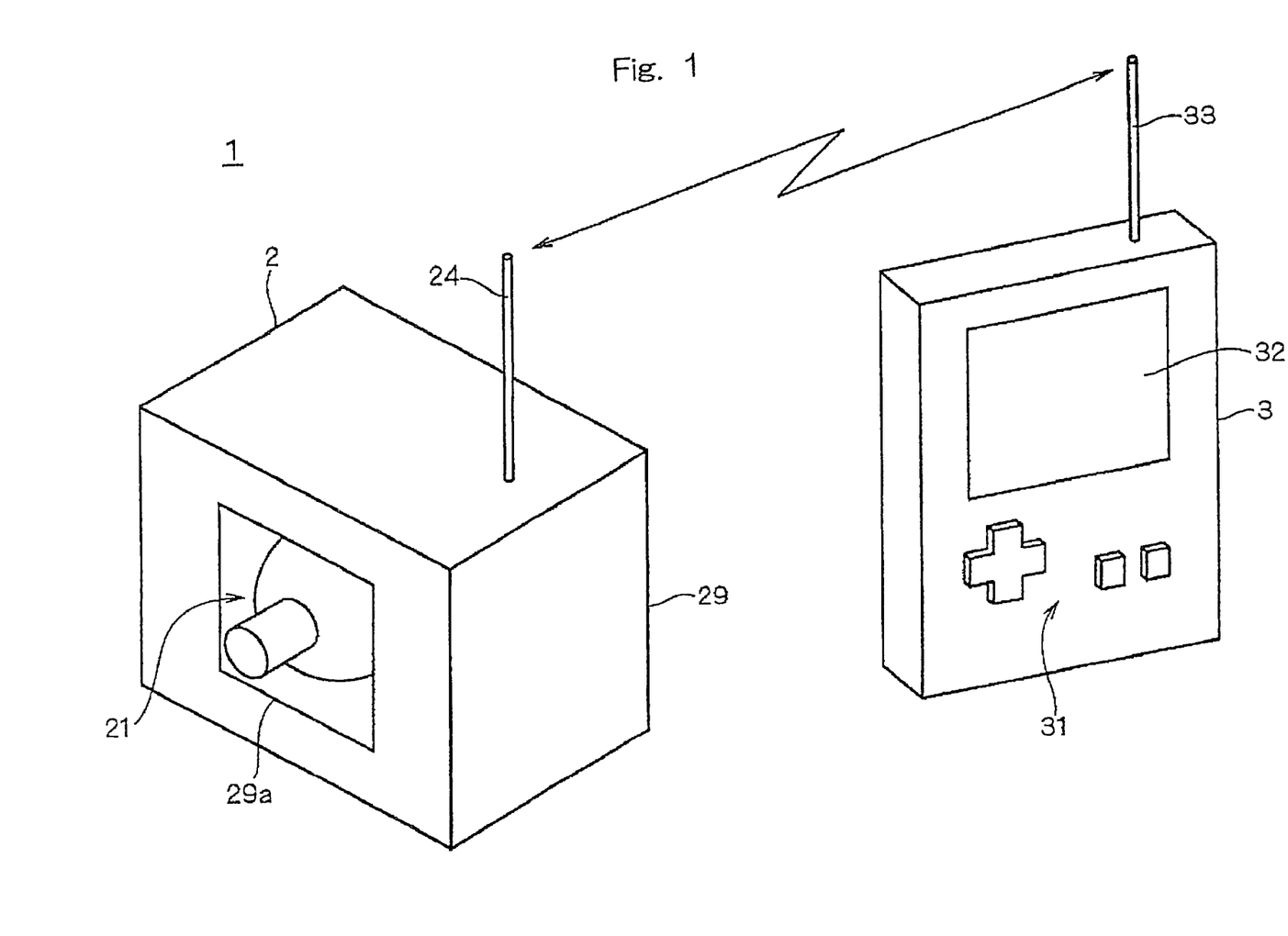
FIG. 1 shows an example of the structure of an image capturing system according to an embodiment of the present invention.

FIG. 1 shows an example of the structure of an image capturing system 1 according to the embodiment of the present invention. The image capturing system 1 comprises: an image capturing apparatus 2 capturing images and generating image data; and an operation apparatus 3 capable of remotely operating the image capturing apparatus 2.

In the image capturing system 1, moving image data obtained by shooting a subject is transmitted from the image capturing apparatus 2 to the operation apparatus 3, and commands for controlling the image capturing apparatus 2 are transmitted from the operation apparatus 3 to the image capturing apparatus 2.

The image capturing apparatus 2 generates moving image data by photoelectrically converting light from the subject like a digital still camera or a digital movie camera. The image capturing apparatus 2 performs panning and tilting so that the shooting direction can be changed, and has a zoom lens system so that the shooting magnification can be changed. The image capturing apparatus 2 is provided with: a main body 29 incorporating circuitry as described later; an image capturing unit 21 disposed in a front part of the main body 29; and an antenna 24 for performing data communication with the operation apparatus 3. The image capturing unit 21 functions as image capturing means for shooting a subject and generating image data. On the front side of the main body 29, an opening 29a is formed so that the image capturing unit 21 does not come into contact with the main body 29 when performing panning and tilting. The image capturing unit 21 is placed inside the opening 29a.

The operation apparatus 3 comprises a portable telephone, a specifically designed operation terminal, a computer or the like. The operation apparatus 3 is capable of remotely operating the image capturing apparatus 2 by being connected to the image capturing apparatus 2 so as to be capable of performing wireless data communication therewith. The operation apparatus 3 is provided with the following in addition to circuitry incorporated in the main body: an operation input member 31 for the user to input commands to the image capturing apparatus 2; an image display 32 providing moving image display based on the received moving image data; and an antenna 33 for performing data communication with the image capturing apparatus 2. The operation input member 31 comprises a plurality of operation buttons such as a preset button and a direction specifying button for driving the image capturing unit 21 in the panning direction and the tilt direction. The image display 32 comprises a liquid crystal display or the like.

While the image capturing system 1 performs wireless communication in the example of FIG. 1, it may perform wire data communication. Moreover, the data communication may take any of the following forms: a communication form via telephone lines; a communication form via the Internet; and a communication form where the image capturing apparatus 2 and the operation apparatus 3 perform direct data communication with each other.

In the image capturing system 1 as described above, for example, it is considered that a plurality of kinds of image capturing apparatuses 2 are present and a plurality of kinds of operation apparatuses 3 are present. For this reason, it is presumed that a command transmitted from the operation apparatus 3 is a command that cannot be executed by the image capturing apparatus 2 and that the moving image data is transmitted from the image capturing apparatus 2 in a format that cannot be processed by the operation apparatus 3. Therefore, in the present embodiment, the image capturing apparatus 2 and the operation apparatus 3 perform a negotiation before a command is transmitted from the operation apparatus 3 or moving image data is transmitted from the image capturing apparatus 2.

Figure 2:
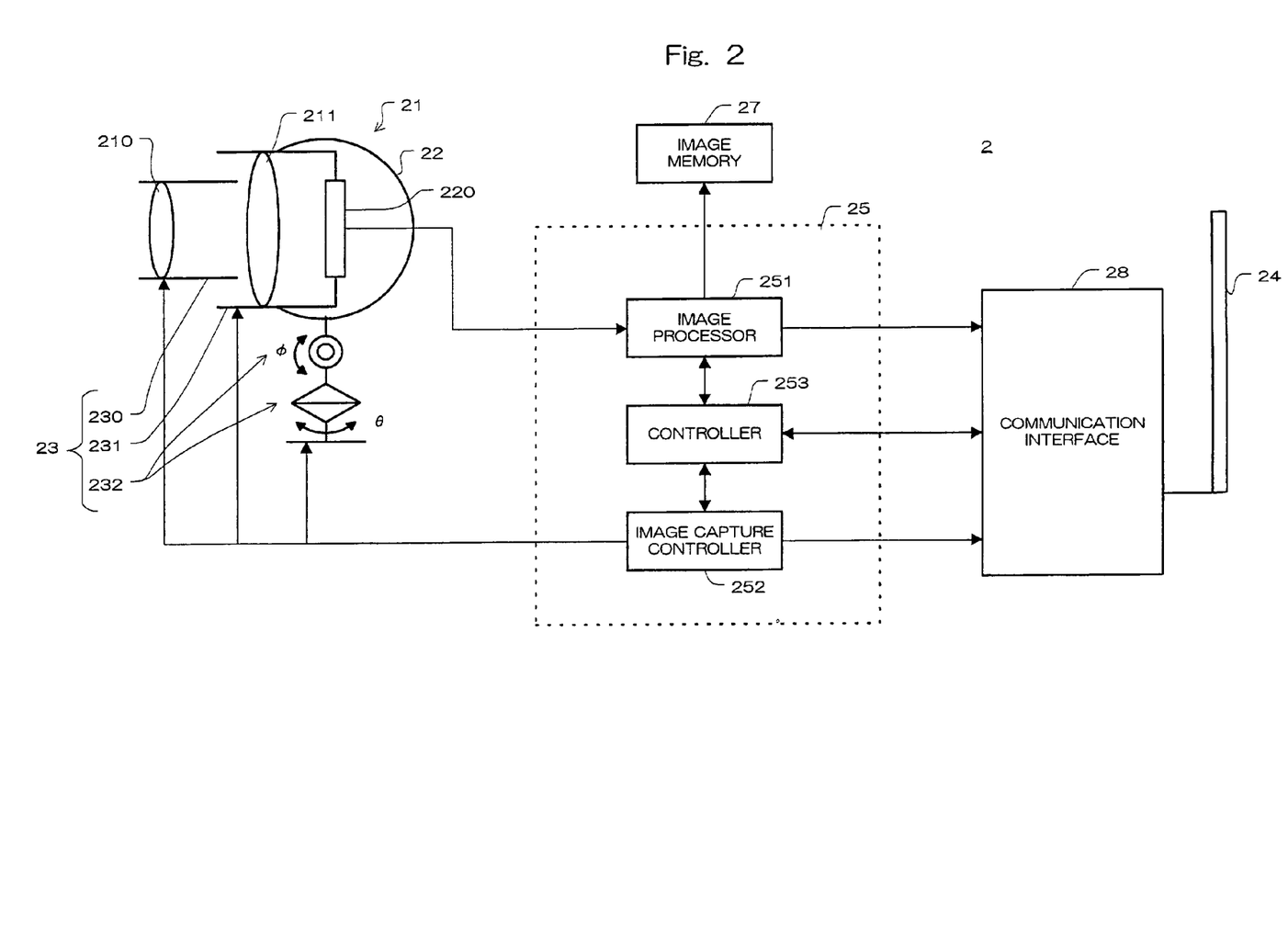
FIG. 2 shows an example of the internal structure of an image capturing apparatus.

FIG. 2 shows an example of the internal structure of the image capturing apparatus 2. The image capturing apparatus 2 is provided with the image capturing unit 21, a data processor 25, an image memory 27, a communication interface 28, and an antenna 24.

As shown in FIG. 2, the image capturing unit 21 of the image capturing apparatus 2 is provided with a zoom lens system 210, a focusing lens system 211, a driver 23, a CCD image capturing sensor 220 and a spherical unit 22 containing these elements. The CCD image capturing sensor 220 photoelectrically converts the light image of the subject formed by the lens into image signals of color components of R (red), G (green) and B (blue) (signals comprising a string of pixel signals received at the pixels). The driver 23 is provided with: a first driver 230 driving the zoom lens system 210 to change the shooting magnification; a second driver 231 driving the focusing lens system 211 to adjust the focus position and driving the diaphragm to adjust the aperture; and a third driver 232 driving the spherical unit 22 for panning and tilting.

The third driver 232 is capable of imparting, for example, to the spherical unit 22 a rotation (θ rotation) of approximately ±120 degrees in the panning direction and an elevation (φ rotation) of approximately ±70 degrees in the tilt direction.

To impart the rotations in the panning and the tilt directions, the third driver 323 includes a plurality of piezoelectric elements. The driving by the first driver 230 for zooming is performed by piezoelectric elements other than the above-mentioned ones. By supplying sawtooth signals to the piezoelectric elements, the element to be driven by the piezoelectric elements is inched, and by repeating this, a required motion is imparted to the element to be driven. The driving mechanisms of the drivers 230 and 232 are not limited to the ones using piezoelectric elements, but other kinds of driving mechanisms such as one using a small-size motor may be adopted.

The operations of the driver 23 and the CCD image capturing sensor 220 in the image capturing unit 21 are controlled by the data processor 25.

The data processor 25 controls the image capturing unit 21 and performs data transmission and reception with the operation apparatus 3 through the communication interface 28. The data processor 25 is implemented, for example, as a CPU, and by the CPU performing predetermined programs, functions as an image processor 251, an image capture controller 252 and a controller 253 are implemented.

The controller 253 performs a negotiation with the operation apparatus 3 to determine the protocol. Either of the image capturing apparatus 2 and the operation apparatus 3 may determine the protocol.

The protocol includes one associated with a moving image attribute when moving image data is transmitted from the image capturing apparatus 2 to the operation apparatus 3, and one with the function of the image capturing apparatus 2 that is remotely operated by the operation apparatus 3.

The moving image attribute is information on characteristics of the moving image data. This information includes, for example, the data format, the image size, the number of colors, the frame rate, the presence or absence of encryption, the compression method and the generation form of the moving image data. The moving image attribute set as a protocol is set so that the image capturing apparatus 2 can handle it when generating moving image data and that the received moving image data can be processed by the operation apparatus 3.

The function of the image capturing apparatus 2 is the function as the target of remote operation by the operation apparatus 3. This function includes, for example, the panning and the tilting functions of the image capturing unit 21, the zooming function, the aperture adjusting function, the shutter speed changing function and the image data recording function.

By the controller 253 previously setting the protocol as mentioned above with the operation apparatus 3, the operation apparatus 3 can appropriately process the moving image data transmitted from the image capturing apparatus 2. In addition, the commands transmitted from the operation apparatus 3 can be appropriately executed by the image capturing apparatus 2.

The controller 253 indicates the content of the image processing to the image processor 251 based on the moving image attribute of the protocol. Moreover, the controller 253 instructs the image processor 251 to perform image recording on the image memory 27. Further, when a command is received from the operation apparatus 3 after the protocol is set, the controller 253 supplies the command to the image capture controller 252.

That is, the controller 253 controls the image processor 251 and the image capture controller 252 after the protocol is set so that the image capturing apparatus 2 appropriately executes the request from the operation apparatus 3 and appropriately transmits moving image data that can be processed by the operation apparatus 3.

When the data processor 25 receives a shooting command from the operation apparatus 3, the image capture controller 252 supplies a shooting instruction to the image capturing unit 21. In response to the shooting instruction, the image capturing unit 21 continuously repeats shooting, and successively outputs image signals. The image signals are input to the data processor 25 one by one, and converted into moving image data.

The image processor 251 performs image processings such as color correction and pixel interpolation on the image signals obtained from the image capturing unit 21, and generates image data. Moreover, the image processor 251 performs, on the image data, image processings based on the moving image attribute indicated by the controller 253. Consequently, moving image data based on the moving image attribute of the protocol is generated, and the generated moving image data is supplied to the communication interface 28. For example, when the image processor 251 is capable of performing a plurality of kinds of image processings, ones suitable for the moving image attribute of the protocol are selected from among the image processings, and consequently, moving image data based on the moving image attribute is generated.

The image processor 251 also has a function of comparing the image signal of the previous frame with that of the current frame and extracting only the image components of the changed parts to generate moving image data. When the generation form of such moving image data is effectively set in the moving image attribute of the protocol, only the changed image components are extracted to generate moving image data.

Further, the image processor 251 generates image data for recording based on a recording instruction from the controller 253, and records the image data for recording into the image memory 27. The image data for recording is not limited to moving image data but may be still image data. Moreover, the image data for recording may be structured so that image processings based on a recording image attribute different from the moving image data transmitted to the operation apparatus 3 are performed thereon. By generating image data for recording by performing image processings based on a recording image attribute different from the moving image data, for example, image data of higher resolution than the moving image data transmitted to the operation apparatus 3 can be recorded.

The image capture controller 252 supplies a driving command to the driver 23 based on the command from the operation apparatus 3, and controls conditions such as the shooting direction, the shooting magnification, the focus position and the aperture of the image capturing unit 21. Moreover, the image capture controller 252 supplies a shooting instruction to the image capturing unit 21.

The image memory 27 comprises a semiconductor memory, a magnetic disk device or the like, and is capable of storing at least one frame of image data for recording supplied from the image processor 251.

The communication interface 28 has a function of performing data communication with the operation apparatus 3, and transmits the data from the data processor 25 to the operation apparatus 3 through the antenna 24. Moreover, the communication interface 28 supplies the data processor 25 with the data received from the operation apparatus 3. In the stage of the negotiation, the controller 253 performs communication with the operation apparatus 3 through the communication interface 28.

Figure 3:
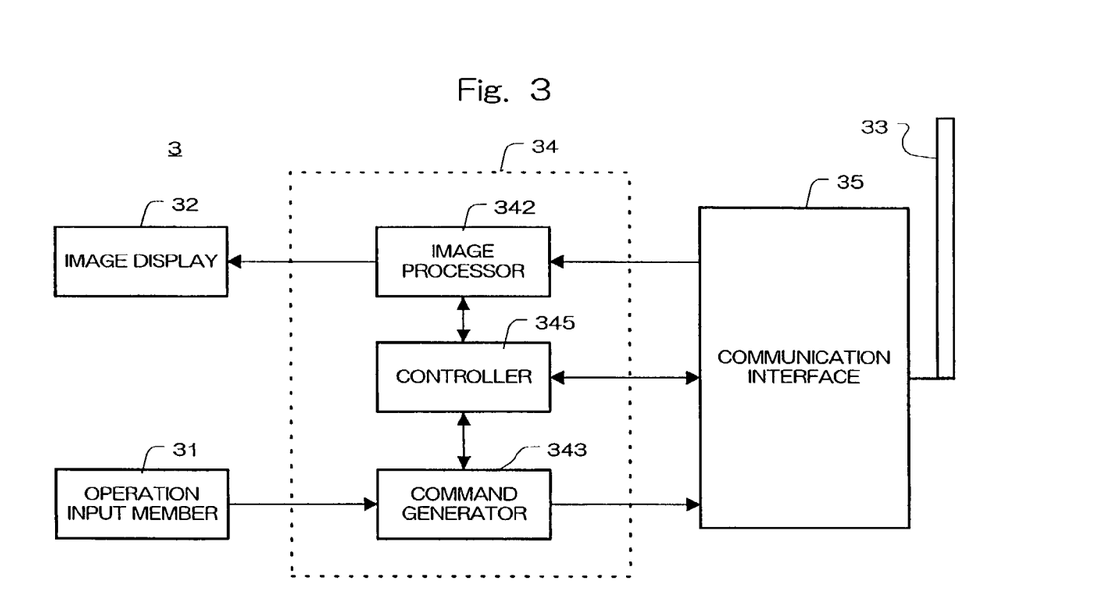
FIG. 3 shows an example of the internal structure of an operation apparatus.

FIG. 3 shows an example of the internal structure of the operation apparatus 3. The operation apparatus 3 has as the internal structure a data processor 34 and a communication interface 35 as well as the above-described operation input member 31, image display 32 and antenna 33. The data processor 34 is implemented, for example, as a CPU, and by the CPU executing predetermined programs, functions as a controller 341, an image processor 342 and a command generator 343 are implemented.

The data received by the antenna 33 is supplied to the data processor 34 through the communication interface 35 having a transmitting function and a receiving function.

The controller 341 performs communication with the image capturing apparatus 2 to perform a negotiation on the protocol for communication between the image capturing apparatus 2 and the operation apparatus 3. The controller 341 controls the image processor 342 and the command generator 343 based on the result of the negotiation.

The image processor 342 receives moving image data through the communication interface 35, and performs predetermined processings (for example, decompression of compressed data, and decryption of encrypted data) based on the protocol on the moving image data. Then, the image processor 342 supplies the moving image data to the image display 32 to display the moving image shot by the image capturing apparatus 2. This moving image display enables the user to confirm the condition of the subject shot by the image capturing apparatus 2 as a moving image.

The controller 341 supplies the image processor 342 with display information on a function which is the target of operation determined by the protocol. Consequently, the image processor 342 can provide a display concerning the function of the image capturing apparatus 2 on the image display 32, so that the user can easily recognize which function of the image capturing apparatus 2 can be operated with the operation apparatus 3. That is, the display concerning the function of the image capturing apparatus 2 provided on the operation apparatus 3 serves as a user interface when the user operates the operation apparatus 3.

When the user inputs an operation command to the image capturing apparatus 2 from the operation input member 31, the command generator 343 generates a command corresponding to the operation command, and supplies it to the communication interface 35.

The controller 341 supplies the command generator 343 with a command specification based on the function of the image capturing apparatus 2. The command specification is information specifying the commands effectively executed by the image capturing apparatus 2. The command generator 343 determines whether the operation command input from the operation input member 31 is included in the command specification or not, and appropriately generates the command corresponding to the operation command when the operation command is included in the command specification. When the operation command input from the operation input member 31 is not included in the command specification, the command corresponding to the operation command is not generated. For example, when the image capturing apparatus 2 does not have the function of panning or tilting the image capturing unit 21, even if the user operates the direction specifying button of the operation apparatus 3, the command corresponding to the operation command is not generated and the operation input by the user is ignored. Consequently, inappropriate commands can be prevented from being transmitted from the operation apparatus 3 to the image capturing apparatus 2.

Examples of the command corresponding to the operation command include a shooting command to start shooting, a recording command to record image data and a control command to change the shooting direction, the shooting magnification and the like of the image capturing unit 21.

Receiving the command from the command generator 343, the communication interface 35 transmits the command to the image capturing apparatus 2 through the antenna 33. In the stage of the negotiation, the communication interface 35 transmits information obtained from the controller 341 to the image capturing apparatus 2.

In the image capturing system 1 having the above-described structure, before the command transmission from the operation apparatus 3 and the moving image data transmission from the image capturing apparatus 2, the image capturing apparatus 2 and the operation apparatus 3 perform a negotiation to set the protocol. The protocol is set with respect to the moving image attribute associated with the moving image data transmitted from the image capturing apparatus 2 to the operation apparatus 3 and the function of the image capturing apparatus 2 which is the target of control when the operation apparatus 3 controls the image capturing apparatus 2.

Next, processing procedures for the image capturing apparatus 2 and the operation apparatus 3 to perform a negotiation to set the protocol in the image capturing system 1 having the above-described structure will be described.

Figure 4:
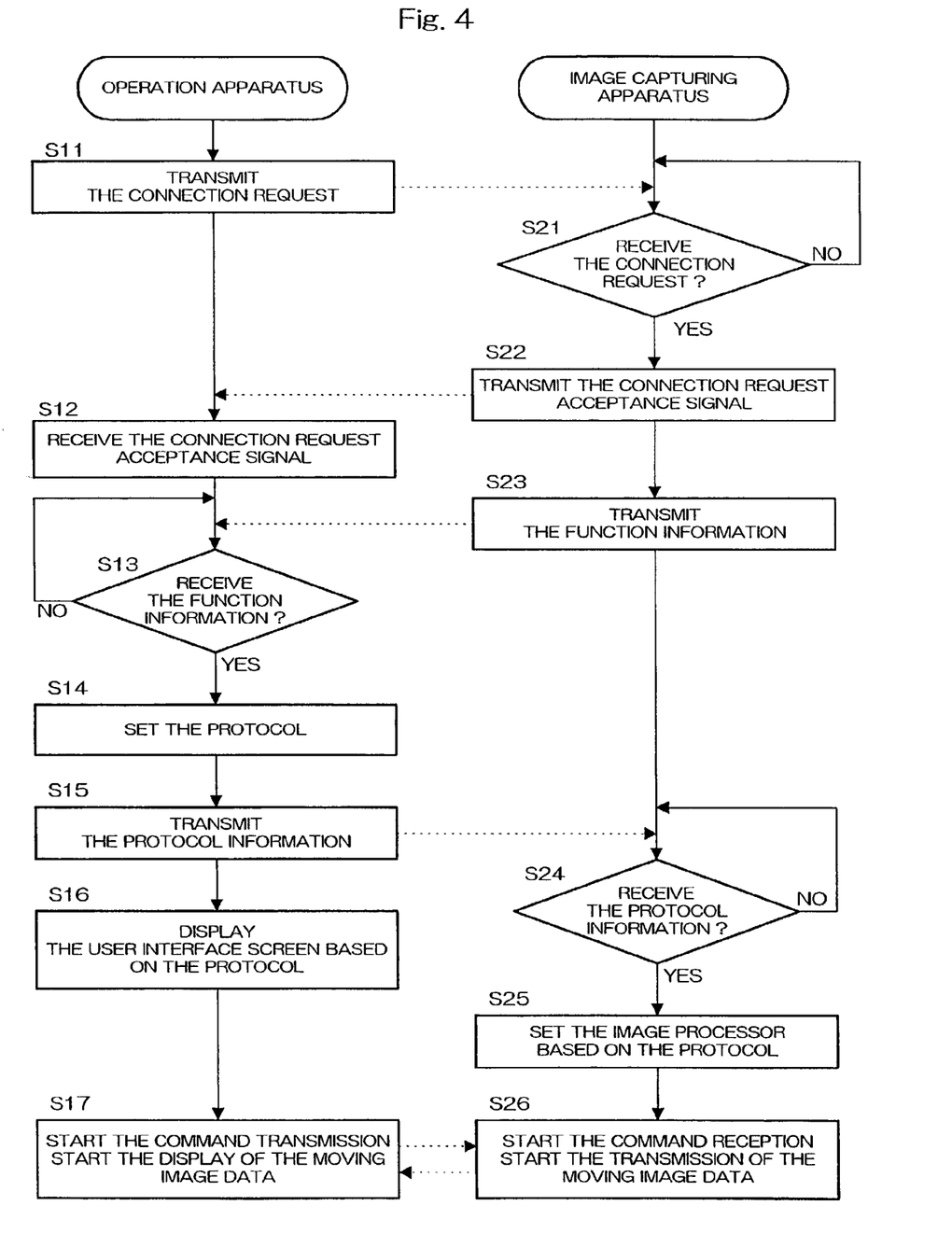
FIG. 4 is a flowchart showing processing procedures of the image capturing apparatus and the operation apparatus.

FIG. 4 is a flowchart showing the processing procedures of the image capturing apparatus 2 and the operation apparatus 3 in the image capturing system 1.

Since the image capturing apparatus 2 and the operation apparatus 3 are not connected to each other in the initial state, first, the operation apparatus 3 transmits a connection request to the image capturing apparatus 2 (step S11). When a plurality of kinds of image capturing apparatuses 2 are present, it is necessary to specify the image capturing apparatus 2 to which the connection request is transmitted. Therefore, an individual ID number is previously registered with each image capturing apparatus 2, and the ID number of at least one image capturing apparatus 2 which is the target of communication is registered with the operation apparatus 3. When the connection request is made from the operation apparatus 3, the ID number of the target of communication is specified, and the connection request is transmitted together with the specified ID number. By using the ID number, the operation apparatus 3 can transmit the connection request to a specific image capturing apparatus 2.

The image capturing apparatus 2 is in a state of waiting for the connection request from the operation apparatus 3 (step S21). Receiving the connection request from the operation apparatus 3, the image capturing apparatus 2 recognizes the ID number, and when the ID number coincides with its own ID number, the image capturing apparatus 2 transmits to the operation apparatus 3 a connection request acceptance signal representing that the connection request from the operation apparatus 3 is accepted (step S22). When the ID number included in the connection request does not coincide with the ID number registered with the image capturing apparatus 2, the image capturing apparatus 2 returns to the connection waiting state (step S21).

The communication network between the image capturing apparatus 2 and the operation apparatus 3 enters a connected state at the point of time when the operation apparatus 3 receives the connection request acceptance signal from the image capturing apparatus 2 (step S12), so that data communication is possible.

After transmitting the connection request acceptance signal, the image capturing apparatus 2 transmits function information to the operation apparatus 3 (step S23). The function information is information on the functions of the image capturing apparatus 2, and includes function information on the image processing that can be performed by the image processor 251 (image processing function information) and function information on the shooting processing that can be handled by the image capturing unit 21 (shooting function information).

The function information on the image processing includes, for example, the settable range of the frame rate when moving image data is generated, the maximum image size that can be generated as moving image data, color settings (color, monochrome, the maximum number of colors, etc.), the data formats that can be used when moving image data is generated (JPEG, MPEG, etc.), the presence or absence of the function of comparing the current frame with the previous frame and extracting only the changed image components when moving image data is transmitted, the presence or absence and the content of the encrypting function, and the presence or absence and the content of the compressing function.

The function information on the shooting processing includes, for example, the presence or absence of the panning and the tilting functions and the operation ranges and the current positions thereof, the presence or absence of the zooming function and the operation range and the current position thereof, the presence or absence of the aperture adjustment function and the adjustment range thereof, the presence or absence of the shutter speed changing function and the change range thereof, and the presence or absence of the image recording function.

That is, at step S23, all the information that can be set or executed by the image capturing apparatus 2 is transmitted as the function information from the image capturing apparatus 2 to the operation apparatus 3.

The operation apparatus 3 is in a state of waiting for reception of the function information from the image capturing apparatus 2 (step S13). Receiving the function information from the image capturing apparatus 2, the protocol for the data communication between the operation apparatus 3 and the image capturing apparatus 2 is set (step S14). Explaining this more specifically, when the operation apparatus 3 receives the function information from the image capturing apparatus 2, of the functions shown as effective in the function information, the functions that can be processed by the operation apparatus 3 are selected to determine the moving image attribute. Further, the functions for which command generation can be appropriately performed are determined to thereby set the protocol.

For example, the operation apparatus 3 compares the maximum image size that can be transmitted by the image capturing apparatus 2 with the maximum image size that can be processed by the operation apparatus 3, and when the maximum image size that can be transmitted by the image capturing apparatus 2 is larger than the maximum image size that can be processed by the operation apparatus 3, the maximum image size that can be processed by the operation apparatus 3 is determined to be the moving image attribute. That is, the maximum image sizes of the operation apparatus 3 and the image capturing apparatus 2 are compared with each other, and the smaller image size is determined as the moving image attribute.

For the frame rate, the operation apparatus 3 compares the maximum frame rate that can be processed by the operation apparatus 3 with the maximum frame rate that can be transmitted by the image capturing apparatus 2, and determines the lower frame rate as the moving image attribute.

For example, when the image processor 342 of the operation apparatus 3 has a function of, when only the image components changed from the previous frame are received, synthesizing the image components with the previous frame, the protocol may be set by determining the moving image attribute associated with the generation form of such moving image data. However, when the operation apparatus 3 does not have the function of synthesizing the image components changed from the previous frame with the previous frame, since appropriate moving image display cannot be performed, the moving image attribute associated with the generation form of such moving image data is not determined.

When the protocol associated with the function of the image capturing apparatus 2 is determined, the controller 341 of the operation apparatus 3 supplies a command specification to the command generator 343 based on the content of the protocol. Consequently, a command set for appropriately operating and controlling the image capturing apparatus 2 at the operation apparatus 3 becomes effective.

Then, the protocol information set at the operation apparatus 3 is transmitted from the operation apparatus 3 to the image capturing apparatus 2 (step S15). The protocol information transmitted at this time includes the moving image attribute of the moving image data generated at the image capturing apparatus 2, that is, a specification associated with the data format, the image size, the number of colors, the frame rate, the presence or absence of encryption, the compression method and the like.

After transmitting the function information, the image capturing apparatus 2 is in a state of waiting for reception of the protocol information from the operation apparatus 3 (step S24). Receiving the protocol information from the operation apparatus 3, the controller 253 of the image capturing apparatus 2 sets the content of the processing at the image processor 251 based on the moving image attribute included in the protocol information (step S25). Consequently, from the image capturing apparatus 2, moving image data can be generated in a condition that can be processed by the operation apparatus 3.

The controller 341 of the operation apparatus 3 generates display information associated with the function which is the target of operation based on the protocol set in association with the function of the image capturing apparatus 2. Then, by supplying the display information to the image processor 342, the controller 341 causes the image display 32 to display a user interface screen (step S16).

Figure 5:
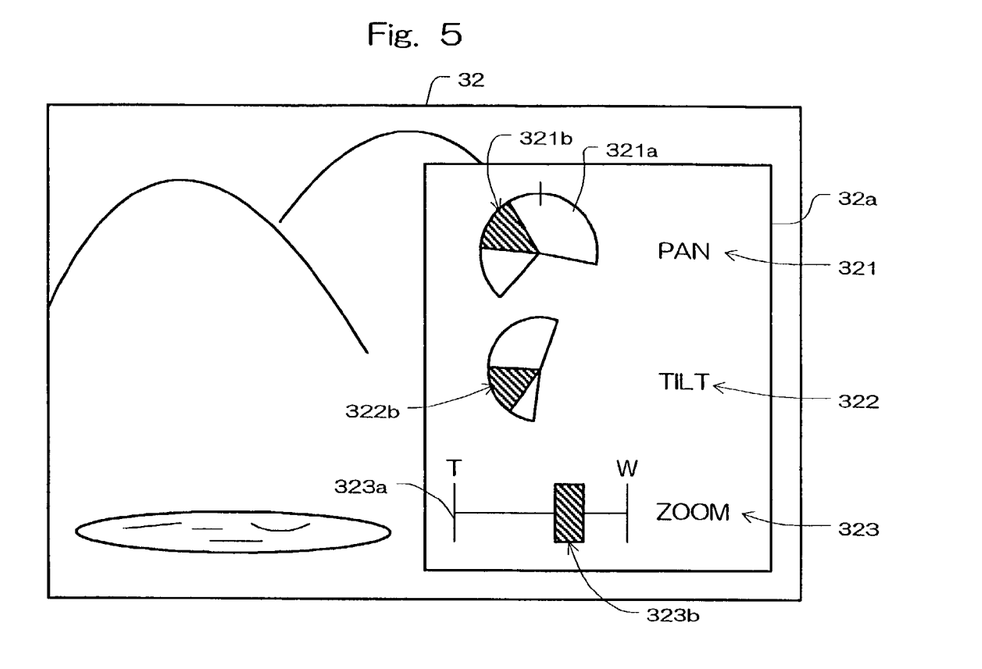
FIG. 5 shows an example of a display screen on an image display.

FIG. 5 shows an example of the display screen on the image display 32. As shown in FIG. 5, on the image display 32, the user interface screen 32a is displayed in a part of the screen where a moving image is displayed. That is, display of the user interface screen 32a is provided together with the moving image display based on the moving image data received from the image capturing apparatus 2. This enables the user to simultaneously visually recognize the moving image and the display information on the function which is the target of operation. Since the user can visually recognize the condition of the shooting function of the image capturing apparatus 2 while visually recognizing the content of the moving image, the operability of the operation apparatus 3 improves.

On the user interface screen 32a shown in FIG. 5, a display 321 concerning the panning function of the image capturing unit 21 of the image capturing apparatus 2, a display 322 concerning the tilting function, and a display 323 concerning the zooming function are provided. This enables the user to easily grasp, on the operation apparatus 3, what kind of shooting function the image capturing apparatus 2 has.

The display 321 concerning the panning function includes a display 321a showing the panning possible range of the image capturing unit 21 of the image capturing apparatus 2 and a display 321b showing the current shooting field. The displays 321a and 321b are provided based on, of the function information on the shooting processing obtained from the image capturing apparatus 2, the information on the operation range of the panning function and the current position thereof. Consequently, the user can easily recognize the current shooting direction of the image capturing unit 21, so that the operability improves when the shooting direction with respect to the panning direction is changed.

Likewise, the display 322 concerning the tilting function includes a display 322a showing the tilting possible range of the image capturing unit 21 of the image capturing apparatus 2 and a display 322b showing the current shooting field. The displays 322a and 322b are provided based on, of the function information on the shooting processing obtained from the image capturing apparatus 2, the information on the operation range of the tilting function and the current position thereof. Consequently, the user can easily recognize the current shooting direction of the image capturing unit 21, so that the operability improves when the shooting direction with respect to the tilt direction is changed.

The display 323 concerning the zooming function includes a display 323a showing the operable range between the maximum and the minimum magnifications of the zooming function and a display 323b showing the current magnification. The displays 323a and 323b are provided based on, of the function information on the shooting processing obtained from the image capturing apparatus 2, the information on the operation range of the zooming function and the current position thereof. Consequently, the user can easily recognize the current shooting magnification of the image capturing unit 21, so that the operability improves when the zooming function is operated and controlled to change the shooting magnification.

The user interface screen 32a varies according to the shooting function of the image capturing apparatus 2.

Figure 6:
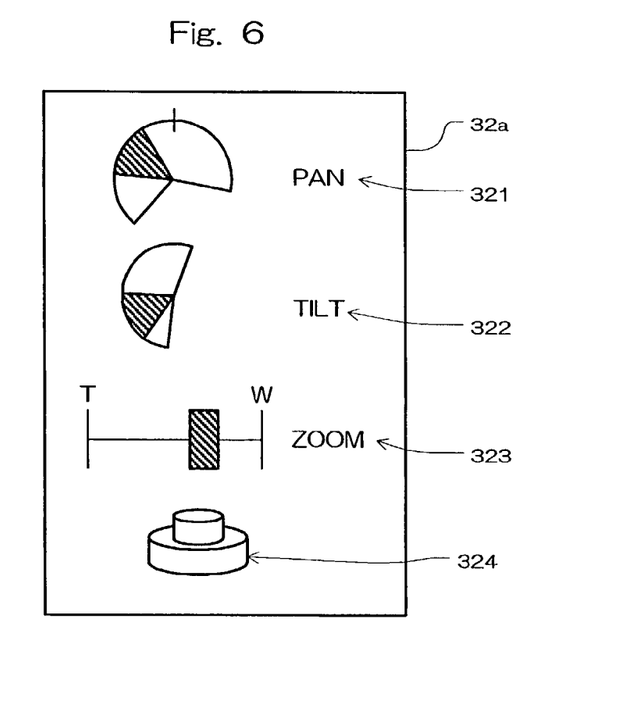
FIG. 6 shows another example of a user interface screen.

FIG. 6 shows another example of the user interface screen. The user interface screen 32b shown in FIG. 6 is a display form adopted when the image capturing apparatus 2 is further provided with the image data recording function. On the user interface screen 32b, the display 321 concerning the panning function, the display 322 concerning the tilting function and the display 323 concerning the zooming function are provided like on the screen of FIG. 5, and a shutter button display 324 is further provided. Consequently, the user can visually recognize that the image capturing apparatus 2 has the function of recording image data, so that the operability of the operation apparatus 3 improves. By the user operating a button of the operation apparatus 3 functioning as a shutter button, the recording command is transmitted from the operation apparatus 3 to the image capturing apparatus 2, so that image data is recorded and stored in the image memory 27 of the image capturing apparatus 2. Consequently, image data at the instant desired by the user can be recorded.

At this time, it is desirable for the image processor 251 of the image capturing apparatus 2 to generate image data for recording by performing an image processing based on a recording image attribute different from the moving image attribute for generating moving image data transmitted to the operation apparatus 3 as mentioned above. By doing this, higher-resolution image data can be recorded than, for example, when one frame of image data is recorded on the operation apparatus 3.

As described above, the user interface screen varies according to the function of the image capturing apparatus 2 which is the target of communication of the operation apparatus 3, whereby the operability is improved when the user remotely operates the image capturing apparatus 2 by operating the operation apparatus 3 with the display on the user interface screen. The user interface screen is not limited to the one displayed as a part of the moving image display screen, but a display form such that the user switches between the moving image display screen and the user interface screen may be used.

By the operation apparatus 3 displaying the user interface screen as described above based on the protocol at step S16 of FIG. 4, the operability of the operation apparatus 3 is improved.

After the negotiation between the image capturing apparatus 2 and the operation apparatus 3 is finished through the above-described processing, the image capturing apparatus 2 and the operation apparatus 3 start transmission and reception of moving image data and a command (steps S17 and S26). At this time, the moving image data transmitted from the image capturing apparatus 2 to the operation apparatus 3 is moving image data generated so as to be processable by the operation apparatus 3, and the command transmitted from the operation apparatus 3 to the image capturing apparatus 2 is a command conforming to the function of the image capturing apparatus 2. Consequently, even when a plurality of combinations of forms of connection between the image capturing apparatus 2 and the operation apparatus 3 is present, transmission and reception of the moving image data and the command can be appropriately performed.

As described above, in the image capturing system 1, the image capturing apparatus 2 performs communication with the operation apparatus 3 to obtain the moving image attribute that can be processed by the operation apparatus 3, and the image processor 251 performs an image processing based on the obtained moving image attribute to generate moving image data. Consequently, since the image capturing apparatus 2 can transmit to the operation apparatus 3 moving image data that can be processed by the operation apparatus 3, unprocessable data can be prevented from being transmitted from the image capturing apparatus 2 to the operation apparatus 3. As a result, image transmission between the image capturing apparatus 2 and the operation apparatus 3 can be appropriately performed.

On the contrary, the operation apparatus 3 performs communication with the image capturing apparatus 2 to previously transmit to the image capturing apparatus 2 the moving image attribute with which moving image data can be processed by the operation apparatus 3, and then, displays the moving image on the image display 32 based on the moving image data received from the image capturing apparatus 2. This enables the image capturing apparatus 2 to generate moving image data that can be processed by the operation apparatus 3 and transmit it to the operation apparatus 3 by performing an image processing based on the moving image attribute previously received from the operation apparatus 3. Consequently, the operation apparatus 3 can prevent unprocessable data from being transmitted from the image capturing apparatus 2, so that image transmission and reception between the image capturing apparatus 2 and the operation apparatus 3 can be appropriately performed.

In particular, since the moving image attribute includes the frame rate of the moving image data, the moving image data can be received at a frame rate that can be processed by the operation apparatus 3, so that appropriate moving image display can be provided on the operation apparatus 3.

Moreover, in the image capturing system 1 of the present embodiment, the image capturing apparatus 2 previously transmits the function information on the function of the image capturing apparatus 2 to the operation apparatus 3, and then, controls the image capturing unit 21 and the image processor 251 based on the command received from the operation apparatus 3. This enables the operation apparatus 3 to generate a command based on the function information previously received from the image capturing apparatus 2 and transmit it to the image capturing apparatus 2. Consequently, the image capturing apparatus 2 can prevent unexecutable commands from being transmitted from the operation apparatus 3, so that remote operation of the image capturing apparatus 2 by the operation apparatus 3 can be appropriately performed.

On the contrary, the operation apparatus 3 performs communication with the image capturing apparatus 2 to previously receive the function information on the function of the image capturing apparatus 2, and determines the operation target function of the image capturing apparatus 2 based on the function information. Then, when an operation command on the operation target function is issued from the operation input member 31, the operation apparatus 3 generates an appropriate command and transmits it to the image capturing apparatus 2. Consequently, since the operation apparatus 3 can transmit a command associated with a function effective in the image capturing apparatus 2, remote operation of the image capturing apparatus 2 by the operation apparatus 3 can be appropriately performed.

Further, when the operation target function is determined based on the protocol, the operation apparatus 3 provides a display based on the operation target function on the image display 32. Consequently, since the user can input an operation command while visually recognizing the condition of the shooting function of the image capturing apparatus 2, the operability of the operation apparatus 3 improves.

While embodiments of the present invention have been described, the present invention is not limited to the embodiments having the contents described above.

While the protocol is set based on the function information which the operation apparatus 3 receives from the image capturing apparatus 2 in the description given above, the present invention is not limited thereto. For example, the protocol may be set after the image capturing apparatus 2 receives function information from the operation apparatus 3 and compares the function of the operation apparatus 3 with the function that can be processed by the image capturing apparatus 2. That is, it is necessary only that the image capturing apparatus 2 be capable of obtaining the moving image attribute that can be processed by the operation apparatus 3 by performing communication with the operation apparatus 3 and the operation apparatus 3 be capable of previously receiving the function information on the function of the image capturing apparatus 2 by performing communication with the image capturing apparatus 2.

Moreover, since the contents described above as information transmitted and received when a negotiation is performed between the image capturing apparatus 2 and the operation apparatus 3 (function information and the like) are an example, information other than the above-described information may be included, or part of the above-described information may be absent.

Moreover, while the series of processings at each part are implemented as software processings by a CPU in the image capturing apparatus 2 and the operation apparatus 3 in the description given above, some or all of the processings maybe implemented as a circuit specifically designed therefor.

Although the present invention has been fully described byway of examples with reference to the accompanying drawings, it is to be noted that various change and modifications will be apparent to those skilled in the art. Therefore, unless otherwise such changes and modifications depart from the scope of the present invention, they should be construed as being including therein.

What is claimed is:

1. An image capturing apparatus comprising:
   an image generator configured to capture an image of a subject and for generating an image signal;
   an image processor configured to receive the image signal generated by the image generator and configured to generate moving image data;
   a transmitter configured to transmit operation capability data to an operation apparatus indicating the operational capability of the image capturing apparatus;
   a receiver configured to receive from the operation apparatus information on a moving image attribute selected by the operation apparatus in accordance with the operation capability data and the capabilities of the operation apparatus;
   a controller configured to cause the image processor to perform an image processing based on the information on the moving image attribute; and
   wherein the transmitter is configured to transmit, to the operation apparatus, moving image data processed based on the information on the moving image attribute.

2. An image capturing apparatus according to claim 1, wherein the information on the moving image attribute includes a frame rate of the moving image data.

3. An image capturing apparatus according to claim 1, further comprising a memory for storing at least one frame of image data, and the operation capability data includes data representing that the image capturing apparatus has an image recording function using the memory.

4. An image capturing apparatus according to claim 3, wherein the image processor generates image data for recording based on information on a recording image function different from the information on the moving image attribute when a recording command is received from the operation apparatus, and the memory stores the generated image data for recording.

5. An operation apparatus capable of controlling an image capture apparatus, comprising:
   a receiver configured to receive operation capability data indicating the operational capability of the image capturing apparatus and to receive moving image data from the image capturing apparatus;
   a display configured to display a moving image based on the received moving image data;
   a transmitter configured to transmit a request for the operational capability data from the image capture apparatus and configured to transmit to the image capturing apparatus information on a moving image attribute selected in accordance with the operational capability data and the capabilities of the operation apparatus before the moving image data is received; and
   a controller configured to cause the display to display the moving image based on the moving image data received from the image capturing apparatus.

6. An operation apparatus according to claim 5, wherein the information on the moving image attribute includes a frame rate of the moving image data.

7. An image capturing apparatus comprising:
   an image generator configured to capture an image of a subject and configured to generate an image signal;
   an image processor configured to receive the image signal generated by the image generator and configured to generate image data;
   a transmitter configured to transmit function capability data to an operation apparatus indicating the functional capability of the image capturing apparatus;
   a function information receiver configured to receive from the operation apparatus function information indicating a function selected by the operation apparatus in accordance with the operation capability data and at least one operational characteristic of the operation apparatus;
   a command receiver for receiving, from the operation apparatus, a command corresponding to the function information of the image capturing apparatus; and a controller for controlling the image generator based on the received command and for controlling the image processor based on the received function information of the operation apparatus.

8. An image capturing apparatus according to claim 7, wherein the function information of the image capturing apparatus includes information on a function of the image generator.

9. An image capturing apparatus according to claim 8, wherein the image generator is capable of changing a shooting direction or a shooting magnification, and the information on the function of the image generator includes a changeable range of the shooting direction or the shooting magnification.

10. An image capturing apparatus according to claim 7, wherein the function information of the operation apparatus is information on a moving image attribute that can be processed by the operation apparatus, and the image processor generates a moving image data based on the information on the moving image attribute.

11. An operation apparatus capable of controlling an image capturing apparatus, comprising:
    an operation member configured to input an operation command to an image capturing apparatus;
    a receiver configured to receive information on a function of the image capturing apparatus from the image capturing apparatus;
    a controller configured to determine an operation target function of the image capturing apparatus based on the information on the function of the image capturing apparatus and at least one operational characteristic of the operation apparatus;
    a command transmitter configured to transmit, when an operation command associated with the operation target function by the operation member is issued, a command corresponding to the operation command to the image capturing apparatus; and
    a function information transmitter configured to transmit function information of the operation apparatus to the image capturing apparatus before the command is transmitted.

12. An operation apparatus according to claim 11, further comprising a display for displaying the operation target function.

13. An operation apparatus according to claim 12, wherein the display provides, as the display based on the operation target function, a display concerning a changeable range of a shooting direction and a current shooting direction of the image capturing apparatus, or a changeable range of a shooting magnification and a current shooting magnification of the image capturing apparatus.

14. An operation apparatus according to claim 12, the display further displays an image data processed based on the function information of the operation apparatus.

15. An operation apparatus according to claim 12, wherein the function information of the operation apparatus is information on a moving image function that can be processed by the operation apparatus.

16. An image capturing system having an image capturing apparatus and an operation apparatus, comprising:
    a first transmitter configured to transmit function information of the image capturing apparatus to the operation apparatus;
    a second transmitter configured to transmit function information of the operation apparatus to the image capturing apparatus;
    a comparator configured to compare the function information of the image capturing apparatus with the function information of the operation apparatus;
    a determiner configured to determine a selected function based on the function information of the image capturing apparatus and the function information of the operation apparatus;
    a first controller configured to control the image capturing apparatus based on the selected function; and
    a second controller configured to control the operation apparatus based on the selected function.

17. An image capturing system according to claim 16, wherein the first controller controls an image processor for processing an image data.

18. An image capturing system according to claim 17, wherein the image processor generates a moving image data.

19. An image capturing system according to claim 18, wherein the second controller controls an image processor for processing the moving image data.

* * * * *

UNITED STATES PATENT AND TRADEMARK OFFICE
CERTIFICATE OF CORRECTION

| | |
|---|---|
| PATENT NO. | : 7,236,185 B2 |
| APPLICATION NO. | : 10/156302 |
| DATED | : June 26, 2007 |
| INVENTOR(S) | : Tomoyuki Terada et al. |

It is certified that error appears in the above-identified patent and that said Letters Patent is hereby corrected as shown below:

Title Page item (54) and col. 1, line 1,
(54), delete "Image Capturing System" and insert -- Image Capturing System Including Remote Control of Image Capturing Unit --.

Signed and Sealed this

Twenty-first Day of August, 2007

JON W. DUDAS
*Director of the United States Patent and Trademark Office*